(12) United States Patent
Imhoff et al.

(10) Patent No.: US 7,992,611 B2
(45) Date of Patent: Aug. 9, 2011

(54) PNEUMATIC TIRE WITH A LENO WEAVE FLIPPER OR CHIPPER

(75) Inventors: Serge Julien Auguste Imhoff, Grand Duchy (LU); Yves Donckels, Natoye (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 585 days.

(21) Appl. No.: 12/210,260

(22) Filed: Sep. 15, 2008

(65) Prior Publication Data
US 2010/0065179 A1    Mar. 18, 2010

(51) Int. Cl.
*B60C 17/00* (2006.01)
*B60C 15/06* (2006.01)
*B60C 9/00* (2006.01)
*D03D 19/00* (2006.01)

(52) U.S. Cl. ........ 152/455; 152/516; 152/542; 152/543; 152/DIG. 14

(58) Field of Classification Search .................. 152/542, 152/543, 539, DIG. 14, 455, 516
See application file for complete search history.

(56) References Cited

U.S. PATENT DOCUMENTS

| | | | |
|---|---|---|---|
| 3,240,251 A * | 3/1966 | Atwell | 152/543 |
| 3,939,893 A | 2/1976 | Schmidt | |
| 4,561,919 A | 12/1985 | Forsyth | |
| 4,739,814 A | 4/1988 | Berczi et al. | |
| 4,877,073 A | 10/1989 | Thise et al. | |
| 4,893,665 A | 1/1990 | Reuter et al. | |
| 5,365,988 A | 11/1994 | Soderberg et al. | |
| 6,601,378 B1 | 8/2003 | Fritsch et al. | |
| 6,659,148 B1 * | 12/2003 | Alie et al. | 152/542 X |
| 6,695,025 B1 | 2/2004 | Roesgen et al. | |
| 6,799,618 B2 | 10/2004 | Reuter et al. | |
| 7,252,129 B2 | 8/2007 | Michiels et al. | |
| 2007/0181238 A1 | 8/2007 | Ternon et al. | |

FOREIGN PATENT DOCUMENTS
WO    WO2007/025765    3/2007
WO    WO2007/071223    6/2007
* cited by examiner

*Primary Examiner* — Adrienne C Johnstone
(74) *Attorney, Agent, or Firm* — Robert N. Lipcsik

(57) ABSTRACT

A pneumatic tire includes an axis of rotation, a carcass, a tread, and a belt structure. The carcass has at least one reinforced ply and a reinforcing structure providing a buffer for absorbing shear strain. The tread is disposed radially outward of the carcass. The belt structure is disposed radially between the carcass and the tread. The reinforcing structure comprises at least one layer of an open construction LENO weave fabric having warp yarns extending in the radial direction and weft yarns extending in the circumferential direction.

14 Claims, 5 Drawing Sheets

PNEUMATIC TIRE WITH A LENO WEAVE FLIPPER OR CHIPPER

FIELD OF THE INVENTION

The present invention relates to a pneumatic tire, and more particularly, to a radial runflat passenger tire or a high performance tire with a flipper and/or chipper.

BACKGROUND OF THE INVENTION

A pneumatic tire typically includes a pair of axially separated inextensible beads. A circumferentially disposed bead filler apex extends radially outward from each respective bead. At least one carcass ply extends between the two beads. The carcass ply has axially opposite end portions, each of which is turned up around a respective bead and secured thereto. Tread rubber and sidewall rubber is located axially and radially outward, respectively, of the carcass ply.

The bead area is one part of the tire that contributes a substantial amount to the rolling resistance of the tire, due to cyclical flexure which also leads to heat buildup. Under conditions of severe operation, as with runflat and high performance tires, the flexure and heating in the bead region can be especially problematic, leading to separation of mutually adjacent components that have disparate properties, such as the respective moduli of elasticity. In particular, the ply turnup ends may be prone to separation from adjacent structural elements of the tire.

A conventional ply may be reinforced with materials such as nylon, polyester, rayon, and/or metal, which have much greater stiffness (i.e., modulus of elasticity) than the adjacent rubber compounds of which the bulk of the tire is made. The difference in elastic modulus of mutually adjacent tire elements may lead to separation when the tire is stressed and deformed during use.

A variety of structural design approaches have been used to control separation of tire elements in the bead regions of a tire. For example, one method has been to provide a "flipper" surrounding the bead and the bead filler. The flipper works as a spacer that keeps the ply from making direct contact with the inextensible beads, allowing some degree of relative motion between the ply, where it turns upward under the bead, and the respective beads. In this role as a spacer, a flipper may reduce disparities of strain on the ply and on the adjacent rubber components of the tire (e.g., the filler apex, the sidewall rubber, in the bead region, and the elastomeric portions of the ply itself).

The flipper may be made of a square woven cloth that is a textile in which each fiber, thread, or cord has a generally round cross-section. When a flipper is cured with a tire, the stiffness of the fibers/cords becomes essentially the same in any direction within the plane of the textile flipper.

In addition to the use of flippers as a means by which to reduce the tendency of a ply to separate, or as an alternative, another method that has been used involves the placement of "chippers." A chipper is a circumferentially deployed metal or fabric layer that is disposed within the bead region in the portion of the tire where the bead fits onto the wheel rim. More specifically, the chipper lies inward of the wheel rim (i.e., toward the bead) and outward (i.e., radially outward, relative to the bead viewed in cross section) of the portion of the ply that turns upward around the bead. Chippers serve to stiffen, and increase the resistance to flexure of, the adjacent rubber material, which itself is typically adjacent to the turnup ply endings.

SUMMARY OF THE INVENTION

A pneumatic tire in accordance with the present invention includes an axis of rotation, a carcass, a tread, and a belt structure. The carcass has at least one reinforced ply and a reinforcing structure providing a buffer for absorbing shear strain. The tread is disposed radially outward of the carcass. The belt structure is disposed radially between the carcass and the tread. The reinforcing structure comprises at least one layer of an open construction LENO weave fabric having warp yarns extending in the radial direction and weft yarns extending in the circumferential direction.

In one aspect of the present invention, the reinforcing structure of the carcass is a flipper. The flipper separates the reinforced ply from a bead of the carcass. The flipper acts as a strain-relieving layer between the bead and the reinforced ply.

In another aspect of the present invention, the fabric has a 10 EPI to 18 EPI warp pair construction and a 5 EPI to 18 EPI weft construction. The warp yarns are 940/1 detex polyaramide and the weft yarns are 1220/1 detex rayon.

In still another aspect of the present invention, the fabric has a 14 EPI warp pair construction and a 12 EPI weft construction.

In still another aspect of the present invention, the pneumatic tire is a radial runflat passenger tire.

In yet another aspect of the present invention, the pneumatic tire is a high performance tire.

In still another aspect of the present invention, the fabric comprises an open construction LENO weave tape. The outside edges of the LENO weave tape each have a pair of warp yarns continuous for the radial length of the LENO weave tape. The LENO weave tape further comprises an adhesion promoter disposed thereon. The reinforcing structure of the carcass is a flipper having two or more layers of LENO weave tape. The flipper includes a layer of rubber between the layers of the LENO weave tape.

In yet another aspect of the present invention, the warp yarns comprise at least two fibers of different fiber materials.

In still another aspect of the present invention, the warp yarns extend circumferentially and radially at a 30 degree angle relative to the radial direction.

In yet another aspect of the present invention, the warp and weft yarns comprise polyamide, aramides (including meta and para forms), polyester, polyvinyl acetate, nylon (including nylon 6, nylon 6,6, and nylon 4,6), polyethylene naphthalate (PEN), cotton, and/or rayon.

DEFINITIONS

"Apex" or "bead filler apex" means an elastomeric filler located radially above the bead core and between the plies and the turnup plies.

"Axial" and "Axially" mean the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Carcass" means the tire structure apart from the belt structure, tread, undertread over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Equatorial Plane" means the plane perpendicular to the tire's axis of rotation and passing through the center of its tread; or the plane containing the circumferential centerline of the tread.

"Flipper" refers to a reinforcing fabric around the bead wire for strength and to tie the bead wire in the tire body.

"Gauge" refers generally to a measurement and specifically to thickness.

"Inner Liner" means the layer or layers of elastomer or other material that form the inside surface of a tubeless tire and that contain the inflating fluid within the tire.

"Lateral" means a direction parallel to the axial direction.

"Normal Load" means the specific design inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Toe guard" refers to the circumferentially deployed elastomeric rim-contacting portion of the tire axially inward of each bead.

"Tread width" means the arc length of the tread surface in the plane includes the axis of rotation of the tire.

"Turnup end" means the portion of a carcass ply that turns upward (i.e., radially outward) from the beads about which the ply is wrapped.

BRIEF DESCRIPTION OF THE DRAWINGS

The structure, operation, and advantages of the invention will become more apparent upon contemplation of the following description taken in conjunction with the accompanying drawings, wherein.

DETAILED DESCRIPTION OF AND EXAMPLE EMBODIMENT

Figure 1:
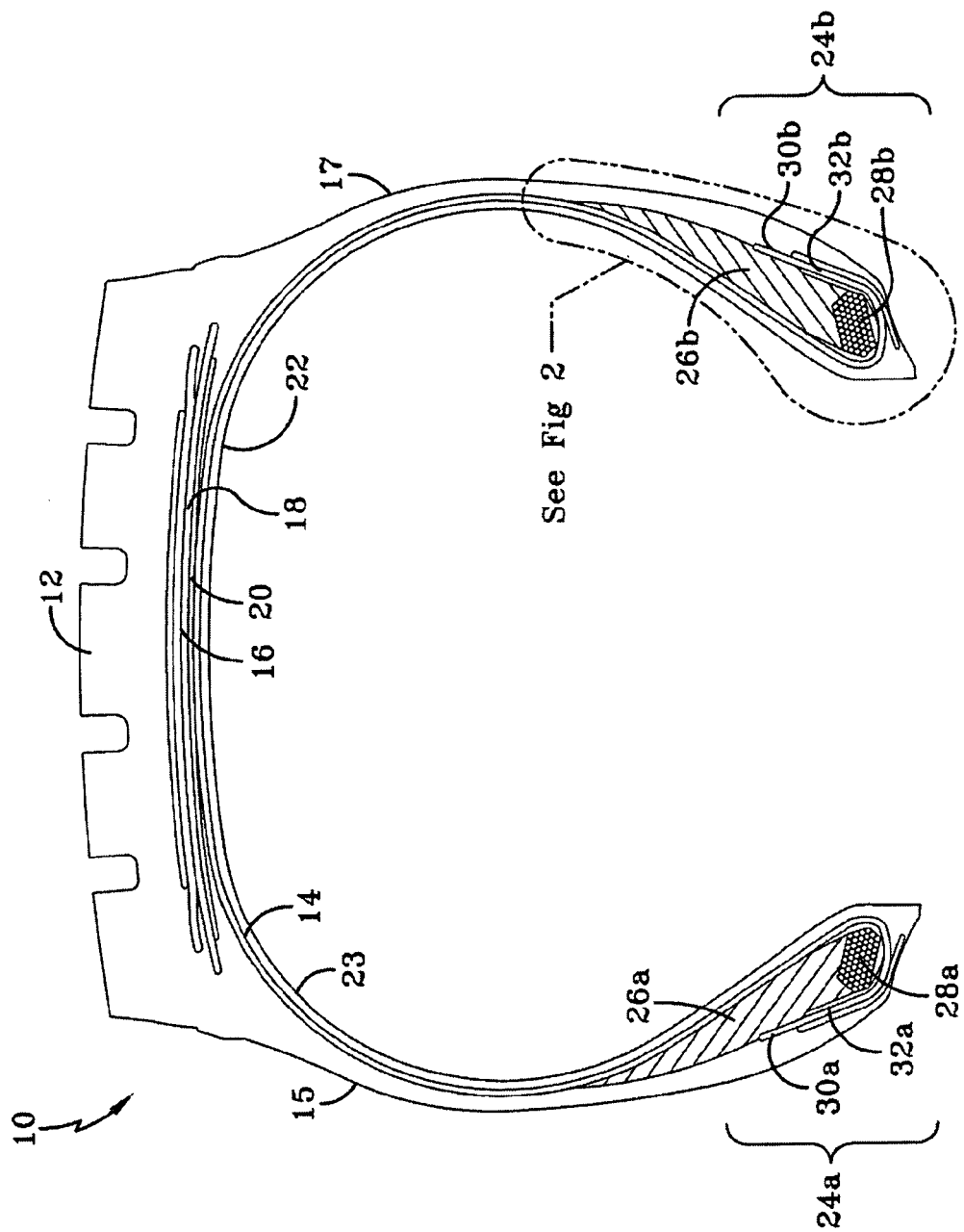
FIG. 1 represents a schematic cross-sectional view of an example tire for use with the present invention.

FIG. 1 shows an example tire 10 for use with reinforcing structures, such as flippers, in accordance with the present invention. The example tire 10 has a tread 12, an inner liner 23, a belt structure 16 comprising belts 18, 20, a carcass 22 with a single carcass ply 14, two sidewalls 15,17, and two bead regions 24a, 24b comprising bead filler apexes 26a, 26b and beads 28a, 28b. The example tire 10 is suitable, for example, for mounting on a rim of a passenger vehicle. The carcass ply 14 includes a pair of axially opposite end portions 30a, 30b, each of which is secured to a respective one of the beads 28a, 28b. Each axial end portion 30a or 30b of the carcass ply 14 is turned up and around the respective bead 28a, 28b to a position sufficient to anchor each axial end portion 30a, 30b, as seen in detail in FIG. 2.

The carcass ply 14 may be a rubberized ply having a plurality of substantially parallel carcass reinforcing members made of such material as polyester, rayon, or similar suitable organic polymeric compounds. The carcass ply 14 engages the axial outer surfaces of two flippers 32a, 32b.

Figure 3:
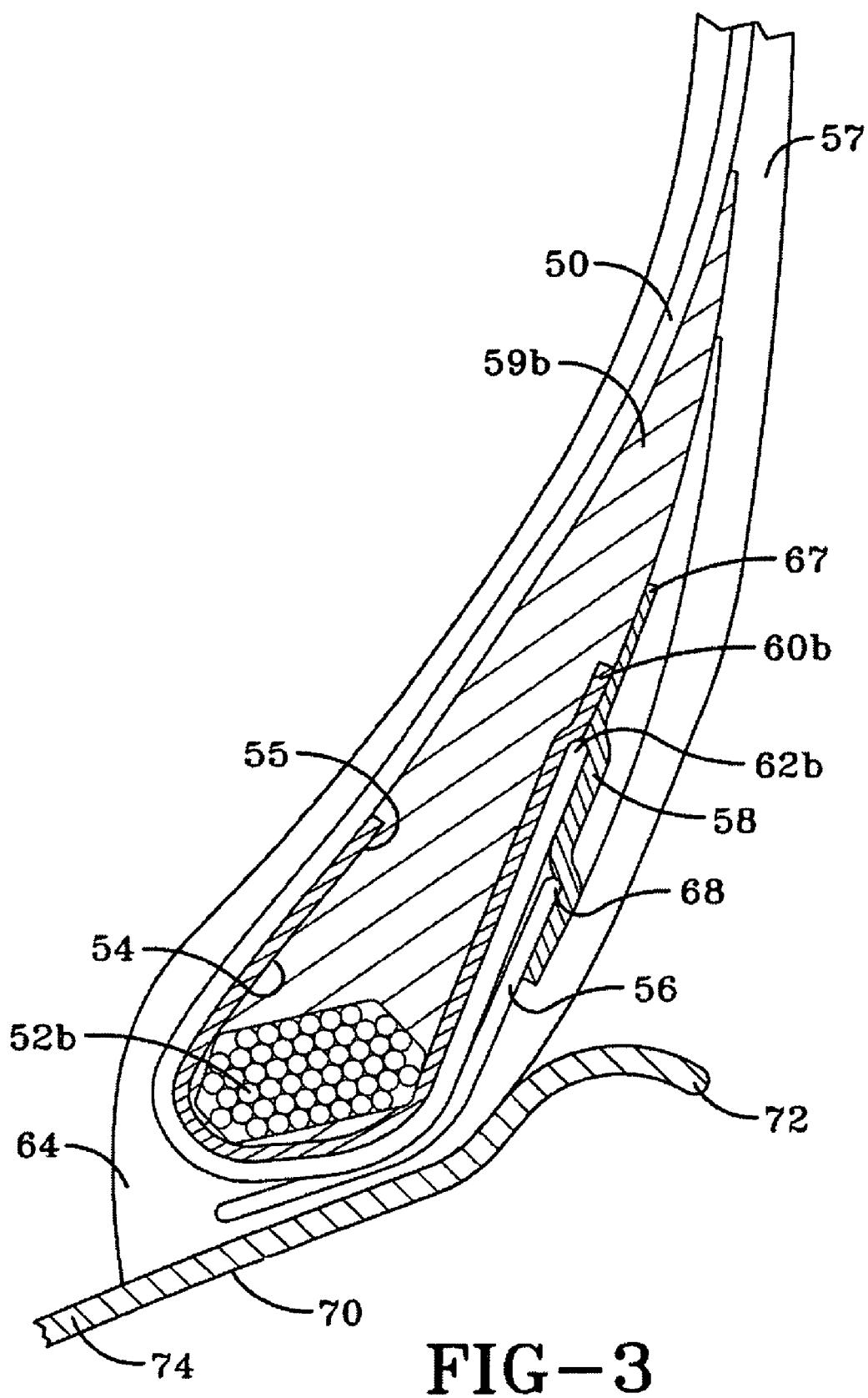
FIG. 3 represents a schematic detail view of another bead region for use with present invention.

FIG. 3 shows, in cross-sectional view, the bead region of another example tire for use with reinforcing structures, such as flippers and chippers, in accordance with the present invention. A carcass ply 50 wraps around a bead 52b and is separated from the bead by a flipper 54. The flipper 54 may be a layer of LENO weave fabric disposed around the bead 52b and inward of a portion of the carcass ply 50 which turns up under the bead. The LENO weave fabric flipper 54 may have physical properties (such as shearing modulus of elasticity) intermediate to those of a rigid metal bead 52b and a less rigid carcass ply 50. The LENO weave fabric flipper 54 therefore may serve as an active strain-relieving layer separating the bead 52b from the carcass ply 50. The carcass ply 50 may be reinforced with metal, as is conventional in the tire art.

The example tire of FIG. 3 also may have a LENO weave fabric chipper 56 located in the bead area for reinforcing the bead area and stabilizing the axially inwardmost part of the sidewall 57. The LENO weave flipper 54 and chipper 56, along with the patch 58 uniting them, are discussed separately below, and then in operational conjunction with one another.

The LENO weave fabric flipper 54 wraps around the bead 52b and extends radially outward into the sidewall regions of the example tire. The axially inward portion 55 of LENO weave fabric flipper 54 terminates within the bead-filler apex 59b. The axially outward portion 60b of the LENO weave fabric flipper 54 lies radially beyond a turnup end 62b, which itself is located radially beyond the radially outermost reach of the chipper 56 (discussed separately below). The axially outwardmost portions 62b of the turnup end 62b of the carcass ply 50 may extend radially outward about 15-30 millimeters beyond the top of a wheel rim flange 72 of a wheel rim 70.

As shown in FIG. 3, the LENO weave fabric flipper 54 is deployed about the bead 52b which is itself circumferentially disposed within the example tire. An axially inward portion 55 of the LENO weave fabric flipper 54 extends radially outward from the bead 52*b* to a location approximately axially adjacent to the top of the wheel rim flange 72 of the wheel rim 70. On an axially outward side, the LENO weave fabric flipper 54 extends radially outward from the bead 52*b* to an end 60*b* above the wheel rim flange 72. The radially outermost reach of the end 60*b* of the LENO weave fabric flipper 54 may extend between about 7-15 millimeters beyond the radially outermost reach of the turnup end 62*b*. The LENO weave fabric flipper 54 may be termed "active" because it actively absorbs (i.e. during tire deflection) differential strains between the relatively rigid bead 52*b* and the relatively less rigid carcass ply 50.

The LENO weave fabric chipper 56 is disposed adjacent to the portion of the carcass ply 50 that is wrapped around the bead 52*b*. More specifically, the LENO weave fabric chipper 56 is disposed on the opposite side of the portion of the carcass ply 50 from the LENO weave fabric flipper 54. The axially inwardmost portion of the LENO weave fabric chipper 56 lies in the portion of the bead region that, when the tire is mounted on the wheel rim 70, would lie closest to a circularly cylindrical part 74 of the wheel rim. The axially and radially outwardmost portion of the LENO weave fabric chipper 56 lies in the portion of the bead region that, when the tire is mounted on the wheel rim 70, would lie axially inward of the circular portion of the wheel rim 70, being separated from the circular portion of the wheel rim by tire rubber such as a toe guard 64.

In other words, as can be seen in FIG. 3, the LENO weave fabric chipper 56 is disposed circumferentially about the radially inwardmost portion of the carcass ply 50 where the carcass ply turns up under the bead 52*b*. The LENO weave fabric chipper 56 may extend radially outward, being more or less parallel with the turned up end 62*b* of the carcass ply 50.

The LENO weave fabric chipper 56 protects the portion of the carcass ply 50 that wraps around the bead 52*b* from the strains in the rubber that separates the LENO weave fabric chipper from the wheel rim 70. The LENO weave fabric chipper 56 reinforces the bead area and stabilizes the radially inwardmost part of the sidewall 57. In other words, the LENO weave fabric chipper 56 may absorb deformation in a way that minimizes the transmission of stress-induced shearing strains that arise inward from the wheel rim 70, through the toe guard 64, to the turned up portion 62*b* of the carcass ply 50, where the LENO weave fabric chipper is most immediately adjacent to the rigid bead 52*b*.

The patch 58 shown in FIG. 3 is circumferentially disposed about the bead 52*b* in such a way as to overlie the radially outermost regions 68 of the chipper 56 and the turned up ends 62*b* of the carcass ply 50. The patch 58 performs a function similar to that of those of the LENO weave fabric chipper 56 and the active LENO weave fabric flipper 54. More specifically, the patch 58 may absorb shearing stresses in the rubber parts which might otherwise induce separation of the flexible rubber from the less flexible material of the LENO weave fabric chipper 56 and the carcass ply 50. The patch 58 may, for example, be made of nylon fabric. The radially outwardmost portion 67 of the patch 58 may reach to a minimum level such as extending by at least 5 mm above the upper end 60*b* of the flipper 54, and preferably 10-15 mm above. The radially inwardmost portion of the patch 58 may overlap about 10 mm with the LENO weave fabric chipper 56.

The net effect of the incorporation of the LENO weave fabric flipper 54 and the LENO weave fabric chipper 56 is to provide strain buffers that relieve or absorb differential shearing strains that otherwise, were the flippers and chippers not present, could lead to separation of the adjacent materials that have disparate shearing moduli of elasticity. Furthermore, this reinforced construction may increase durability of the tire by means of the incorporation of a smaller number of components than for standard constructions with gum strips.

Figure 2:
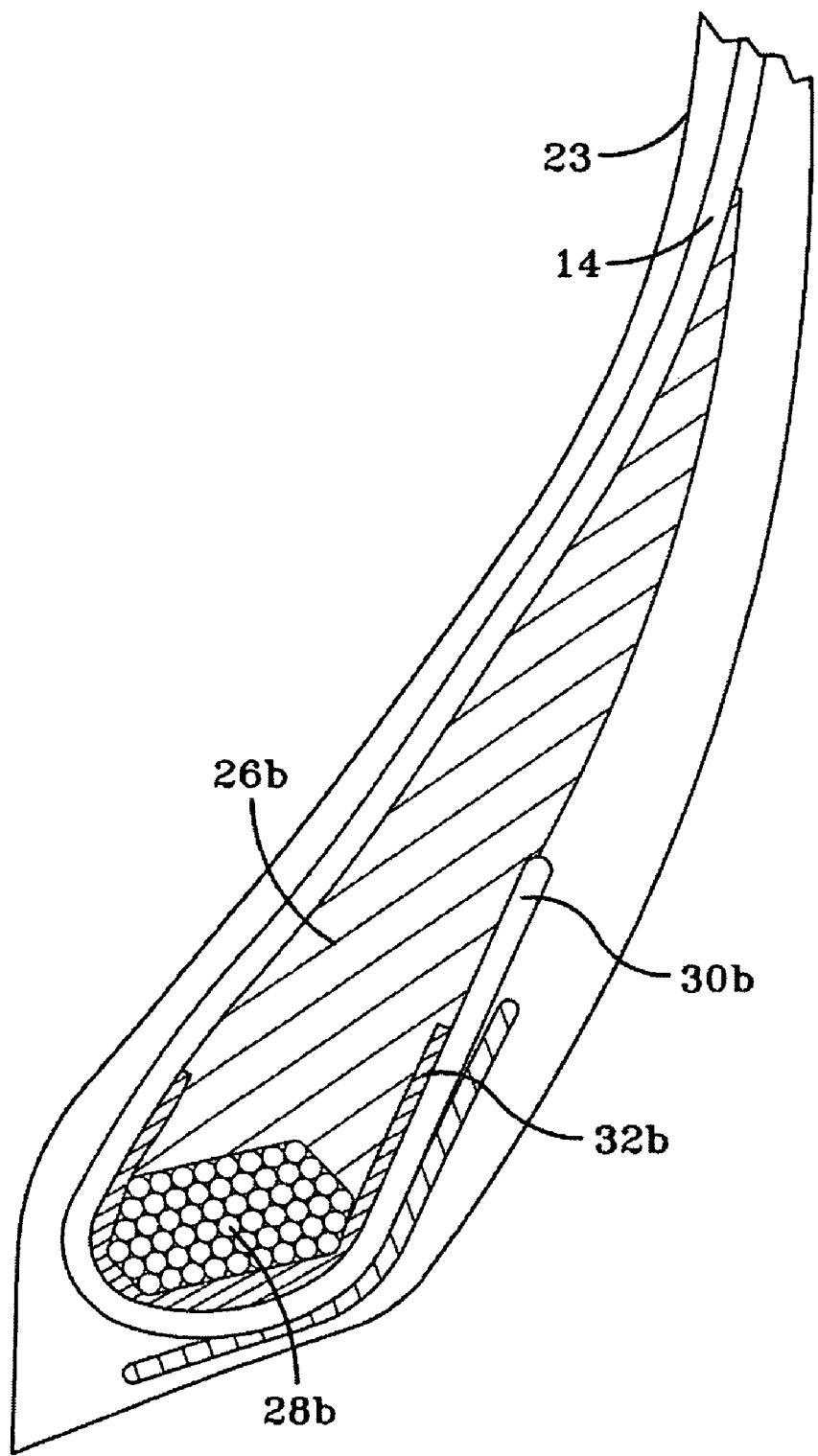
FIG. 2 represents a schematic detail view of the bead region of the example tire shown in FIG. 1.
Figure 4:
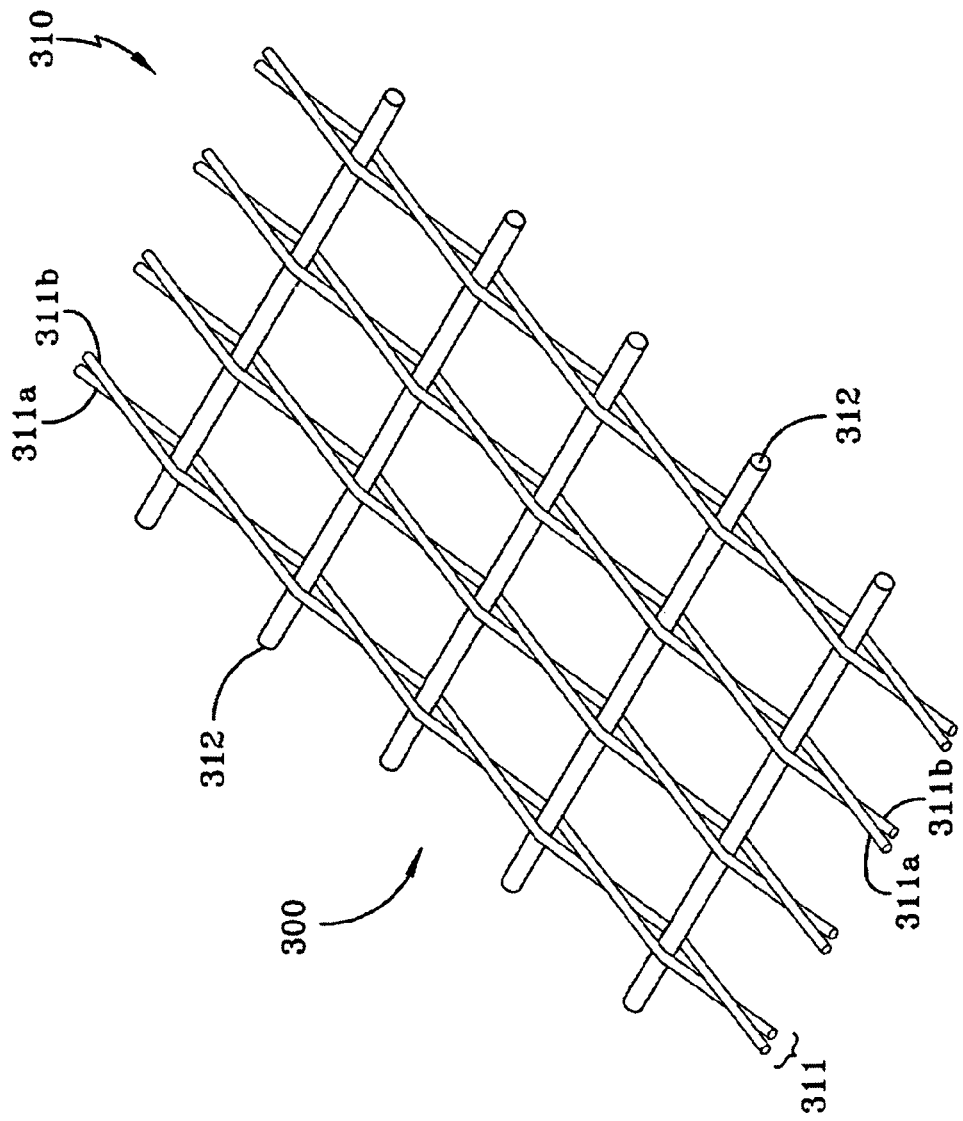
FIG. 4 represents a schematic detail of an example fabric in accordance with the present invention.

In accordance with the present invention, the flippers 54 and chippers 56 of the example tires of FIGS. 1 through 3 comprise LENO weave fabric, such as that described in U.S. Pat. No. 7,252,129 to Michiels et al., which is hereby incorporated by reference into this application in its entirety. As illustrated in the example of FIG. 4, a flipper 54 or chipper 56 may comprise a layer 300 of LENO tape 310 with warp yarn pairs 311 and weft yarns 312. Each warp yarn pair 311 may have warp yarns 311*a* and 311*b* twisting around each other between fill weft yarns 312.

Figure 5:
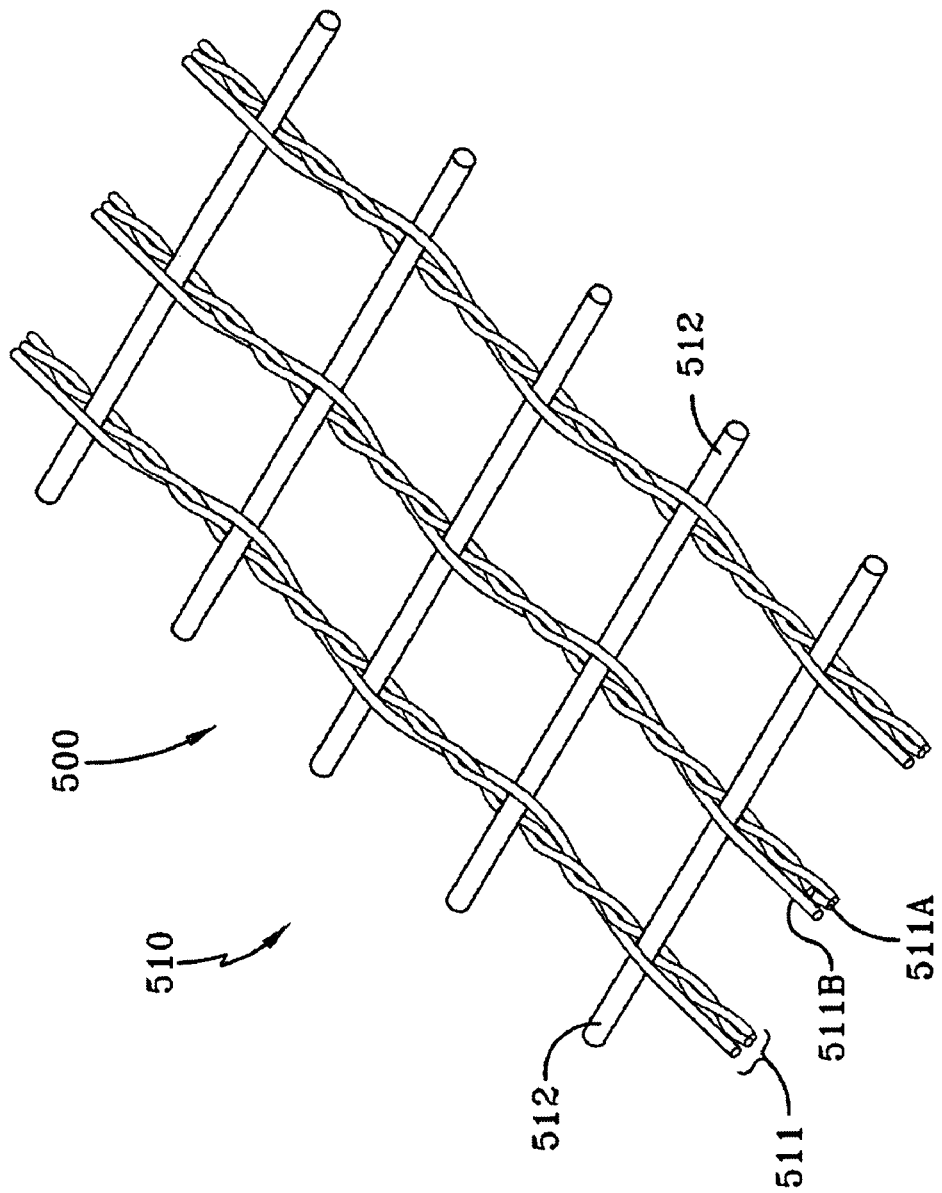
FIG. 5 represents a schematic detail of another example fabric in accordance with the present invention.

As illustrated alternatively in the example of FIG. 5, a flipper 54 or chipper 56 may comprise a layer 500 of LENO 2T tape 510 with warp yarns 511 and weft yarns 512. Each warp yarn 511 may have a first set of twisted pairs of filler warp yarns 511*a* extending on one side of, and perpendicular to, fill weft yarns 512 and a second set of warp yarns 511*b* extending generally parallel to and below the filler warp yarns 511*a* and alternating above and below the weft yarns 512.

As seen in FIG. 4, the warp yarn pairs 311 extend longitudinally along the LENO tape 310. It is the warp yarns 311*a* and 311*b* that provide most of the reinforcement of the flipper 54 and/or chipper 56. The construction, material, size, and spacing of the warp yarns 311*a* and 311*b* are selected such that they provide the desired strength for the flipper 54 and/or chipper 56. The warp yarns 311*a* and 311*b* may be a spun staple yarn, a multifilament yarn, and/or a monofilament yarn formed of a suitable material.

Examples of suitable materials for the warp yarns 311*a*, 311*b* include polyamide, aramides (including meta and para forms), polyester, polyvinyl acetate, nylon (including nylon 6, nylon 6,6, and nylon 4,6), polyethylene naphthalate (PEN), cotton, rayon, polyketone, carbon fiber, PBO, and glass fiber. The weft yarns 312 hold the warp yarn pairs 311 in a desired spaced apart orientation.

The weft yarn 312 may be a spun staple yarn, a multifilament yarn, and/or a monofilament yarn formed of a suitable material. Examples of suitable materials for the weft yarn 312 include cotton, rayon, polyester, polyamide, aramides (including meta and para forms), polyvinyl acetate, nylon (including nylon 6, nylon 6,6, and nylon 4,6), PEN, polyketone, carbon fiber, PBO, and glass fiber.

The warp and/or weft yarns 311, 312 may also be hybrid yarns. Hybrid yarns may be multiply yarns, made up of at least 2 fibers of different material (for example, cotton and nylon). These different fiber materials may produce hybrid yarns with various chemical and physical properties. Hybrid yarns may be able to change the physical properties of the final product in which they are used. Example hybrid yarns may be an aramide fiber with a nylon fiber, an aramide fiber with a rayon fiber, and an aramide fiber with a polyester fiber.

As illustrated in FIG. 4, the construction of the LENO tape 310 may be a LENO weave. In a LENO weave, warp yarns may be arranged in pairs with one twisted around the other between fill, or weft, yarns. In the LENO tape 310, the LENO weave pattern helps securely hold the warp yarn pairs 311 and weft yarns 312 at a desired spaced apart position. The LENO weave pattern also allows the warp yarns 311*a*, 311*b* to have a mechanical resiliency within the LENO tape 310.

As used herein, mechanical resiliency of a yarn is the ability of the yarn to displace longitudinally without an elastic deformation of the material. Mechanical resiliency allows the LENO tape 310 to have a minor amount of resilient elongation for compatibility with the example tires of FIGS. 1-3, but use stronger yarns in the carcass ply layers 14, 50.

The LENO tape 310 may be constructed with a width of about 5 mm to 25 mm. Further, the LENO tape 310 may be constructed with a width of about 8 mm to 15 mm. The width of the LENO tape 310 may determine the formation of a uniform flat layer of the LENO tape 310 for the flipper 32b, 54 or chipper 56.

The LENO tape 310 is an open construction fabric which permits the strike through of rubber in a tire for a better bonded construction. The openness of the fabric used for the LENO tape 310 is usually determined by the spacing and character of the warp yarn pairs 311. The weft yarns 312 are typically spaced as necessary to maintain the position of the warp yarn pairs 311.

The length and width of LENO tape 310 will be suitable for the flipper 32b, 54 and/or chipper 56. Greater strength may be built into the LENO tape 310 by constructing the LENO tape such that the warp yarns 311a, 311b of the outermost warp yarn pairs 311 in the LENO tape, run longitudinally for the length of the LENO tape 310 as continuous uncut yarns. Even greater strength may be built into the LENO tape 310 by constructing the LENO tape with all of the warp yarns 311a, 311b running longitudinally for the length of the LENO tape as continuous uncut yarns.

The LENO tape 310 may be treated with an adhesion promoter. Examples of adhesion promoters include resorcinol formaldehyde latex (RFL), isocyanate based material, epoxy based material, and materials based on melamine formaldehyde resin. The LENO tape 310 may also have a tackified finish, or green tack, applied for facilitating adhesion during the building process of a green tire. The selection of materials for the tackified finish may depend upon the materials selected for use in the tire. Tackified finishes may be achieved by various methods such as coating the fabric in an aqueous blend of rosin and rubber lattices, or with a solvent solution of an un-vulcanized rubber compound.

Further, the flipper 32b, 54 and/or chipper 56 may comprises multiple layers, e.g. two, three, or even more layers, of the LENO tape 310 to provide extra strength for the flipper and/or chipper. When more than one layer of LENO tape 310 is used for the flipper 32b, 54 and/or chipper 56, a layer of unvulcanized rubber may be placed between the layers of LENO tape to ensure an effective bond.

The formation of the LENO tape 310 may begin with the acquisition of the basic yarns for the fabric. Subsequently, the yarns are twisted to provide additional mechanical resilience. After the twisting, warp yarns 311a, 311b may be placed on a large beam for the formation of the layer 300. The layer 300 may be formed by LENO weaving with the appropriate spacing of the warp yarn pairs 311. The layer 300 may be formed in large widths, such as 61.4 inches. After the layer 300 formation, the layer may be finished with adhesive promoter, such as an RFL treatment. If a tackified finish is desired, this is provided following the adhesive promoter finishing. The final layer may be slit into the specific widths of LENO tape 310 for placement on a spool. Cross-winding the LENO tape 310 across a cardboard tube may provide a convenient package for subsequent removal of the LENO tape in the manufacturing process of a tire.

The flipper 32b, 54 and/or chipper 56 in accordance with the present invention improves prior art runflat and high performance tires by optimizing runflat mileage, high speed capability, and handling characteristics, without increasing manufacturing complexity. Additionally, the flipper 32b, 54 and/or chipper 56 may reduce noise due to vibration damping in the bead area (i.e., circumferential reinforcement provided by the weft yarns 312. Further, the LENO tape 310 need not be calendered and may be applied at the tire building machine (i.e., a spool of slit LENO tape directly applied at the tire building machine). Also, the LENO tape 310 may be applied symmetrically to both beads, or asymmetrically to only one bead. The width of the LENO tape 310 may depend on specific design requirements. The warp pairs 311 of the flipper 32b, 54 and/or chipper 56 may be oriented radially or at an angle, such as in a range from 15 to 60 degrees, or more specifically from 30 to 55 degrees, with respect to the circumferential direction of the tire.

One example construction may comprise 940/1 dtex or 940/2 dtex 14 EPI (ends per inch) nylon warp yarns and 1220/1 dtex 6 EPI rayon weft yarns. In general, the warp pairs 311 may have a density of 10 EPI to 18 EPI and the weft may have a density of 5 EPI to 18 EPI.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having an axis of rotation, the pneumatic tire comprising:
   a carcass having at least one reinforced ply, each reinforced ply including a pair of axially opposite end portions turned up around a pair of beads, and a reinforcing structure in the form of a flipper at one or both end portions which completely separates the at least one reinforced ply from the respective bead thereby providing a buffer for absorbing shear strain;
   a tread disposed radially outward of the carcass; and
   a belt structure disposed radially between the carcass and the tread,
   the flipper comprising at least one layer of an open construction LENO weave fabric having warp yarns yarn pairs extending in the radial direction and weft yarns extending in the circumferential direction.

2. The pneumatic tire of claim 1 wherein the fabric has a 10 EPI to 18 EPI warp pair construction and a 5 EPI to 18 EPI weft construction.

3. The pneumatic tire of claim 2 wherein the warp yarns are 940/1 dtex polyaramide and the weft yarns are 1220/1 dtex rayon.

4. The pneumatic tire of claim 3 wherein the warp yarn pairs have a density of 14 EPI and the weft yarns have a density of 12 EPI.

5. The pneumatic tire of claim 1 wherein the fabric has a LENO 2T configuration with a 10 EPI to 18 EPI warp pair construction and a 5 EPI to 18 EPI weft construction.

6. The pneumatic tire of claim 5 wherein the warp yarn pairs have a density of 14 EPI and the weft yarns have a density of 12 EPI.

7. The pneumatic tire of claim 1 wherein the pneumatic tire is a radial runflat passenger tire.

8. The pneumatic tire of claim 1 wherein the pneumatic tire is a high speed tire.

9. The pneumatic tire of claim 1 wherein the open construction LENO weave fabric is in the form of an open construction LENO weave tape.

10. The pneumatic tire of claim 9 wherein outside edges of the LENO weave tape each have a pair of warp yarns continuous for the radial length of the LENO weave tape.

11. The pneumatic tire of claim 10 wherein the LENO weave tape further comprises an adhesion promoter disposed thereon.

12. The pneumatic tire of claim 9 wherein the flipper has two or more layers of the LENO weave tape.

13. The pneumatic tire of claim 12 wherein the flipper includes a layer of rubber between the layers of the LENO weave tape.

14. The pneumatic tire of claim 1 wherein the warp yarns each comprise at least two fibers of different fiber materials.

* * * * *